S. BRAY,

Assignor to J. L. & H. ILLOWAY.

Stock Car.

No. 9,681. Reissued April 26, 1881.

Attest
Chas. F. Gessert
Alfred B. Benedict

Inventor
Sanford Bray
By Geo. H. Murray
his Atty.

N. PETERS, PHOTO-LITHOGRAPHER, WASHINGTON, D. C.

UNITED STATES PATENT OFFICE.

SANFORD BRAY, OF CHARLESTOWN, MASSACHUSETTS, ASSIGNOR TO JACOB L. ILLOWAY AND HENRY ILLOWAY, OF CINCINNATI, OHIO.

STOCK-CAR.

SPECIFICATION forming part of Reissued Letters Patent No. 9,681, dated April 26, 1881.

Original No. 223,876, dated January 27, 1880. Application for reissue filed March 19, 1881.

*To all whom it may concern:*

Be it known that I, SANFORD BRAY, a citizen of the United States, residing at Charlestown, in the county of Suffolk and State of Massachusetts, have invented a new and useful Improvement in Cattle-Cars, of which the following is a specification, reference being had to the accompanying drawings.

The object of my invention is to furnish cattle-cars so constructed that the cattle can be conveniently loaded and unloaded, and may be arranged compactly in the cars by being held therein more or less diagonally with the cars.

Figure 1:
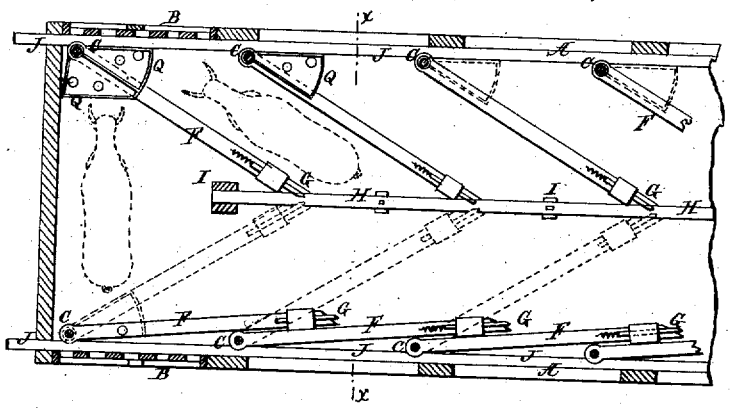
Figure 2:
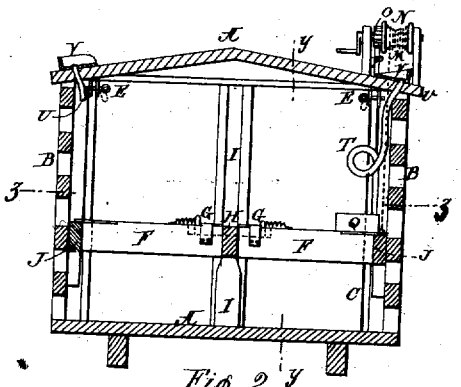
Figure 3:
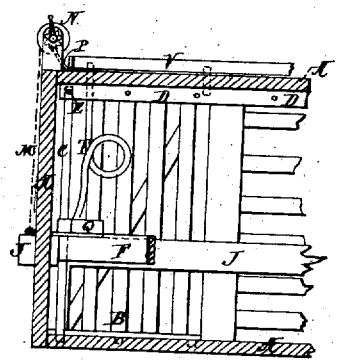
Figure 5:
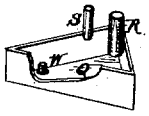
Figure 4:
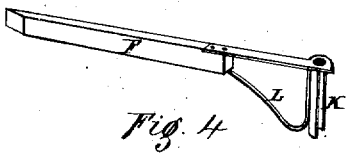

In the drawings, Figure 1 is a sectional plan view of my improvement, taken through the line *z z*, Fig. 2. Fig. 2 is a sectional end elevation, taken through the line *x x*, Fig. 1. Fig. 3 is a sectional side elevation taken through the line *y y*, Fig. 2. Fig. 4 is a perspective view of one of the swinging bars. Fig. 5 is a perspective view of one of the troughs.

A represents the body of a car, in each end of each side of which is formed a door, B, for the entrance and egress of the cattle. Along the sides of the car are placed upright standards or stanchions C, at a greater or less distance apart, according as larger or smaller cattle are to be carried. The lower ends of the standards C are inserted in holes or sockets in the floor of the car, and their upper ends are inserted in a groove in a bar or channel-plate, D, attached to the roof of the car, where they are secured in place by pins E. I prefer to use split spring-pins E to prevent them from jarring out.

To the standards C are hinged the ends of bars F, which separate the cattle. The inner or free ends of the hinged bars F are provided with spring-bolts G, to engage with notches in the sides of the central bar, H, and fasten the said bars F in place. The ends of the bars F are made to fit against the central bar, H, and the ends of the spring-bolts are beveled, so that the said bars may fasten themselves automatically as they are pushed into place, which may be done from the outside of the car with a stick. The bars F are arranged so that they may be, as shown, diagonal, to make apartments suited to the length of the cattle. For short cattle the bars F may be fitted to be, when closed, nearly or quite at right angles with the sides of the car.

The central bar, H, is held in place by supports I, attached to the car, and may be stationary, or so arranged that it may be raised and lowered. The central bar, H, does not extend to either end of the car, space being left at each end for the passage of the cattle.

At one end of the car is placed a continuation of the bar H, which is not shown in the drawings, and which is designed to be hinged at one end, so that it may be swung around to either side.

J are long bars placed between the standards C and the sides of the car A. One end of the bars J projects through vertical slots in the end of the car A. The other end of the bars J terminates opposite the other end of the central bar, H, so that the cattle in entering the car can pass the said bars J.

The hinged ends of the bars F are made with projecting flanges or lips to overlap the upper edges of the side bars, J, so that said hinged bars F may be raised and lowered by and with the said bars J.

The bars F may be made with downwardly-projecting semi-tubular arms K, to rest against the standards C, and thus give the said bars F a firmer bearing. In this case the semi-tubular arms K are strengthened by braces L, as shown in Fig. 4.

To the ends of the bars J are attached the ends of cords or chains M, the other ends of which are attached to windlasses N, secured to the top of the car, and which are provided with ratchet-wheels O and pawls P, to hold the bars J in any position into which they may be adjusted.

Q are troughs, which are made with tubular bearings R, to receive the standards C, and which rest upon the bars F and J, so that they may be raised by and with the said bars. To each trough Q is also attached a short pipe, S, to receive the end of a rubber tube, T, the other end of which is attached to the lower end of a short pipe, U. The pipes U pass up through the roof of the car A, and open into troughs V, formed upon the said roof, so that the cattle can be conveniently watered by pouring water into the said troughs V. Another advantage of this arrangement is, that in case of rain the water will flow down into the troughs Q and water the stock without any labor. The troughs Q are provided with discharge-openings W, through which the contents of the said troughs may be drawn off when desired.

In loading the car the two bars F at the rear end of the car are raised, the other bars F are swung out against the sides of the car, and the swinging continuation of the central bar, H, is swung to one side. A single animal is then admitted, and is secured across the other end of the car by two bars, F. Other animals are then admitted, one at a time, and secured by the bars F until one side of the car is filled. The continuation of the central bar, H, is then secured in line with the central bar, H, and the other side of the car is filled.

The car is unloaded by raising the bars F and J and allowing the cattle to pass out at the forward end of the car through the doors B.

Having thus described my invention, I wish it to be understood that I do not wish to limit myself to the particular construction of the stalls, as shown, and I claim as my invention—

1. A stock-car with two rows of stalls arranged diagonally upon each side, for the purposes specified.

2. In a cattle-car, the combination, with the car-body A, of the swinging bars F and the central bar, H, substantially as and for the purpose set forth.

3. In a cattle-car, the combination, with the car-body A, of the standards C, the swinging bars F, provided with the spring-bolts G, the central bar, H, and the side bars, J, substantially as described.

4. In a cattle-car, the combination, with the side bars, J, that support the swinging bars F, of the chains M and windlasses N, substantially as shown and described, for raising and lowering the bars J and F, as set forth.

5. In a cattle-car, the combination, with the standards C and the swinging bars F, of the semi-tubular arms K and the braces L, substantially as and for the purpose set forth.

6. In a stock-car, the combination of the car-body and a series of stalls arranged diagonally therein with a series of triangularly-shaped troughs arranged in the angles of said stalls, substantially as specified.

SANFORD BRAY.

Witnesses:
EDW. DUMMER,
HUGH MOSS.